United States [11] 3,631,288

[72] Inventor Howard G. Rogers
 Weston, Mass.
[21] Appl. No. 5,194
[22] Filed Jan. 23, 1970
[45] Patented Dec. 28, 1971
[73] Assignee Polaroid Corporation
 Cambridge, Mass.

[54] SIMPLIFIED POLARIZED LIGHT PROJECTION ASSEMBLY
 8 Claims, 2 Drawing Figs.
[52] U.S. Cl. ................................... 313/112,
 240/9.5, 350/147, 350/152
[51] Int. Cl. ................................... H01j 5/16
[50] Field of Search ........................ 313/112;
 350/147, 152, 157, 158; 240/9.5

[56] References Cited
 UNITED STATES PATENTS
2,252,324  8/1941  Land ........................... 313/112 X
3,528,723  9/1970  Roger .......................... 350/152 X
2,453,194 11/1948  Buzzell ......................... 313/112 X
2,748,659  6/1956  Geffcken et al. ............... 313/112 X
3,153,740 10/1964  Murphy .......................... 313/112

Primary Examiner—Herman Karl Saalbach
Assistant Examiner—Saxfield Chatmon, Jr.
Attorneys—Brown and Mikulka, William D. Roberson and Frederick H. Brustman ABSTRACT: An improved assembly for projecting polarized light uses a concave reflecting polarizer which is confocal with a concave metal reflector having a light source at its focus. Light possessing a preferred polarization azimuth is transmitted by the polarizer. Light possessing the orthogonal polarization azimuth is reflected back by the polarizer and circulates between the reflector and the polarizer. Its polarization is altered slightly by reflection from the metal. A small fraction, related to the degree of alteration, is transmitted by the polarizer. After several traverses a significant portion of the orthogonal polarization component is altered and transmitted through the polarizer.

PATENTED DEC 28 1971 3,631,288

INVENTOR.
HOWARD G. ROGERS

BY Brown and Mikulka
and
Frederick H. Brustman
ATTORNEYS

SIMPLIFIED POLARIZED LIGHT PROJECTION ASSEMBLY

BACKGROUND OF THE INVENTION

U.S. Pat. application Ser. No. 762,280 for a Light Projection Assembly by A. Makas, filed Sept. 16, 1968, now U.S. Pat. No. 3,566,099 and assigned in common with the present application discloses a light projection assembly which employs a quarter-wave plate between a reflector and a planar polarizing element. Improved polarized light projection assemblies according to the present invention do not require the use of quarter-wave retardation layers between the polarizer and reflector.

Polarizers referred to hereafter are the reflective type which have the property of dividing incident light into substantially two linearly polarized components having orthogonal vibrational azimuths. One polarization component is transmitted by the polarizer while the orthogonally polarized component is reflected backward. Backward reflection from these polarizers is substantially specular. Among reflective polarizers appropriate for use in the assembly of this invention are those described in U.S. Pat. No. 2,224,214 for Light Polarizing Body, and U.S. Pat. application Ser. No. 834,339 for Light Polarizer and Method of Making Same, filed June 18, 1969, by Howard Rogers and Ser. No. 722,509 for Light Polarizer, filed Feb. 12, 1968, by G. R. Bird et al. All are assigned in common with this application. Other forms of reflective polarizers are suitable too.

The combination of elements in the present invention provide a light-projecting assembly which transmits only one polarization component having a selected azimuth and scavenges energy from the reflected component by altering its polarization form by repeated reflections at a metal surface. Reflection from metal surface introduces a slight ellipticity to the linearly polarized component of light reflected by the polarizer. On subsequently returning to the polarizer, the rejected component is transmitted in proportion to the degree of ellipticity imposed on it during recirculation within the light projection assembly. This process is repeated many times and a substantial portion of the rejected polarization component is altered so it is transmitted by the polarizer.

In the preferred embodiment of the invention a light source is mounted at the focus of a parabolic metal reflector. A polarizer is mounted in front of the metal reflector receiving light directly from the source and also by reflection. A first light component, possessing a selected polarization azimuth is transmitted by the polarizer. Light having the orthogonal polarization azimuth is reflected back toward the metal reflector.

Reflection from metal surfaces alters linearly polarized light to an elliptical form. Ellipticity in the reflected polarized light component is related to the angle of incidence on the metal and the particular metal used. Some metals have been found to exert a stronger effect than others. On reaching the polarizer a second time, part of the rejected polarization component, now elliptically polarized to some degree, is transmitted. The remainder is again reflected as linearly polarized light. Transmission by the polarizer at second incidence is proportional to the ellipticity introduced by reflection from the metal surface within the light-projecting assembly. Elliptically polarized light can be treated as two, out of phase, light components linearly polarized in orthogonal directions. The polarizer passes the component aligned with its transmission axis. Light which is again reflected by the polarizer recirculates repeating the process.

Light transmitted by the assembly is uniformly polarized having a unique vibrational azimuth. Conventional polarizing techniques project less than half the available light in polarized form. Polarized light output from a projection assembly according to this invention is greater than one-half the light emitted by the source. Ellipticity imposed on the otherwise rejected polarized light circulating in the assembly converts it, in part, to a form which is transmitted by the polarizer. Total polarized output of the projector, using a specific light source is greater, thereby increasing the efficiency of the assembly. This is accomplished using fewer elements than prior polarizing light projection assemblies.

Uses contemplated for the assembly include antiglare headlight systems for vehicles, as well as monoscopic and stereoscopic projection systems, and the like. Since polarizers utilized in this assembly are quite efficient, as pointed out in the aforementioned applications, it seems quite promising especially for use in vehicle headlights where a substantial amount of light is required.

Accordingly, it is an object of this invention to provide a novel polarizing light projection assembly of simpler construction than heretofore known.

It is further the object of this invention to provide a novel polarizing light projecting assembly with fewer parts than heretofore required.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

The embodiments of the light projection assemblies described hereinafter represent an auto headlight incorporating a parabolic reflective polarizer. It emits uniformly linearly polarized light vibrating in a selected azimuth depending upon the orientation of the polarizer selected. In antiglare headlight systems, each approaching automobile may have a polarizer in or over its windshield as well as a pair of polarized headlights. Alternately, polarized glasses can be worn by the driver. In one scheme, all linear polarizers are parallel and oriented at 45°. The axes of an auto's headlight and windshield polarizers are parallel with each other maximizing the driver's utilization of light from his own headlights, but "crossed" with the headlights of an approaching vehicle eliminating glare from them.

Figure 1:
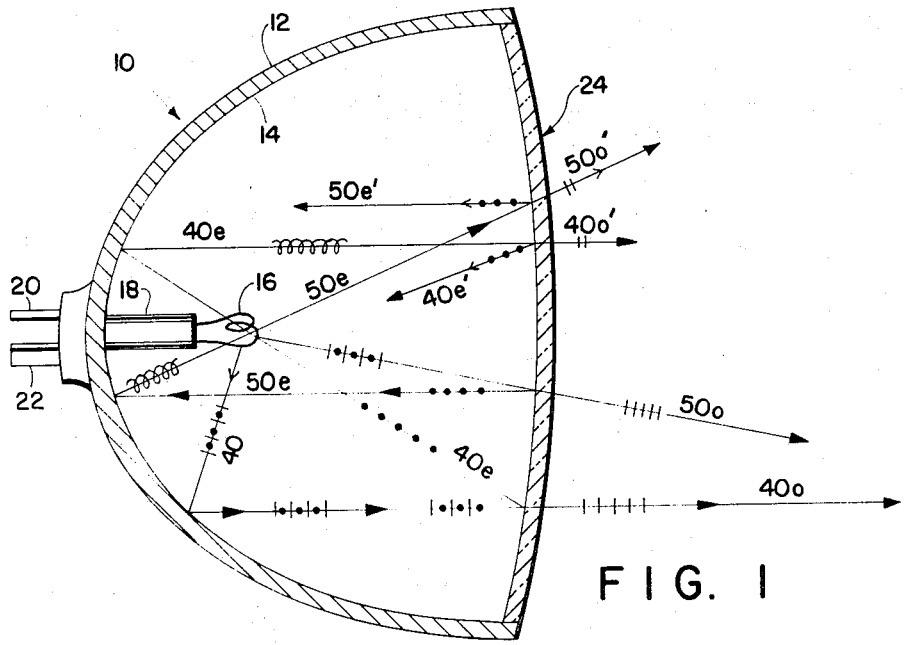
FIG. 1 illustrates the improved polarizing light projection assembly according to the invention.

Referring to FIG. 1, polarized headlight 10, consists of a concave parabolic envelope 12 having a highly polished metal reflecting surface 14 on its inside. A light source, such as a tungsten filament 16, is positioned at the focus of metal reflector 14. Insulating post 18 which may be an integral part of glass envelope 12, supports filament 16. Prongs 20, 22 are used to make electrical contact between a power source (not shown) and filament 16. At the mouth of the parabolic envelope 12 is a reflective polarizer 24. Polarizer 24 is parabolic and confocal in the preferred embodiment, with reflector 14. Reflective polarizer 24 is characterized by transmitting linearly polarizer 24 is characterized by transmitting linearly polarized light having a specified polarization azimuth and reflecting light possessing the orthogonal polarization azimuth. Wire grid arrays in glass can be used in those circumstances where polarizer 24 must be capable of withstanding high temperatures or other adverse conditions in which the use of glass or similar materials is desirable. Such polarizers are described in the above-cited U.S. Pat. No. 2,224,214 and application for U.S. Pat. Ser. No. 722,509. Multilayer birefringent polarizers (interference polarizers) as described in the above-referred U.S. application, Ser. No. 834,339 can be used where service conditions are less severe or protection can be provided.

Light ray 40 emanating from filament 16 is representative of the many rays which are reflected off polished metal surface 14 and projected in a beam. Ray 40 is unpolarized. By convention and for convenience the ray can be represented as having two orthogonal polarization azimuths. Ray 40's unpolarized state is represented by a series of alternating dots and vertical lines. Vertical lines represent one polarization azimuth, dots the orthogonal polarization azimuth. After reflection from metal surface 14, ray 40 is incident on reflecting polarizer 24. Reflecting polarizer 24 transmits a specified polarization azimuth present in ray 40. Light ray 40o represents the polarization azimuth transmitted by polarizer 24. Vertical lines through ray 40o denote it as being polarized in a vertical azimuth. Generally, light ray 40o can be expected to have one-half the energy of incident unpolarized light ray 40. Polarizer 24 reflects the rest of the energy as horizontally polarized light ray 40e. Dots along ray 40e denote it as being polarized in a horizontal azimuth. Polarizer 24 is concave and confocal with reflector 14. Their optic axes are parallel too. Loose coils in filament 16 permit a substantial amount of light such as ray 40e to pass through the focal point and be incident on reflector 14 again. Metal surface 14 reflects light ray 40e forward in the general direction taken by light ray 40o. It is very important to note at this point that after reflection by metal surface 14, light ray 40e is no longer linearly polarized light. Linearly polarized light reflected at other than normal incidence from a metal surface has its state of polarization altered to an elliptical form. The degree of ellipticity depends on the particular metal and incidence angle. A slight ellipticity is introduced by reflection at a dielectric surface too. Properly designed multilayer dielectric surfaces might enhance the effect.

It is useful to use a phenomenological approach in the following description. Because of its peculiar interaction with a linear polarizer, such as 24, elliptically polarized light can be considered to be composed of two orthogonal linear polarization components which are out of phase. The two polarization components can be represented by orthogonal vectors whose magnitude is related to the ellipticity of ray 40e. By this convention linearly polarized light would be represented by a first vector having unit length and a second vector having zero length. Circularly polarized light is represented by orthogonal vectors having equal length and a $\pi/2$ phase shift. Any degree of elliptical polarization can then be represented by orthogonal vectors having unequal lengths in an appropriate ratio and a $\pi/2$ phase shift. This description is quite useful, because the vectors can be assumed to have any orientation; e.g., parallel and perpendicular to the polarizer's transmission axis. Elliptically polarized light incident on a linear polarizer is transmitted in relation to the magnitude of the vector aligned with the polarizer's transmission axis.

It can be appreciated that a fraction of elliptically polarized ray 40e incident on polarizer 24 is transmitted therethrough. Elliptically polarized ray 40e can be resolved into two linearly polarized components one of which is aligned with the transmission axis of polarizer 24. A small amount of vertically polarized light, 40o, is transmitted adding to the strength of the light previously transmitted. Another component of elliptically polarized ray 40e is reflected by polarizer 24 as ray 40e'. Ray 40e' is linearly polarized in the horizontal direction. Polarizer 24 reflects ray 40e' towards the confocal point of parabolic surfaces 14 and 24 and the process described repeats ad infinitum as a decreasing portion of the original ray 40e continues to circulate in the assembly until its energy is rotated to the selected polarization azimuth and transmitted by polarizer 24.

Ray 50 represents light which proceeds directly from filament 16 towards polarizer 24. Polarizer 24 transmits the vertical polarization component 50o and reflects the horizontal polarization component 50e. By the process previously described, the horizontal polarization component 50e of ray 50 circulates between the two parabolas, becoming elliptically polarized by each reflection from metal surface 14. The vertical polarization component in the elliptic polarization is transmitted by polarizer 24 while the horizontal component is reflected to repeat the scavenging process.

Polarizer 24 orients and transmits half the unpolarized light reaching it. The rest is reflected as vertically polarized light at first incidence toward metal reflector 14 to be elliptically polarized and returned to polarizer 24 which passes some of it as vertically polarized light. Repetition results in a substantial fraction of the rejected polarization component being altered to the preferred polarization azimuth and transmitted. A very efficient polarizing light projection assembly of simple design results.

Figure 2:
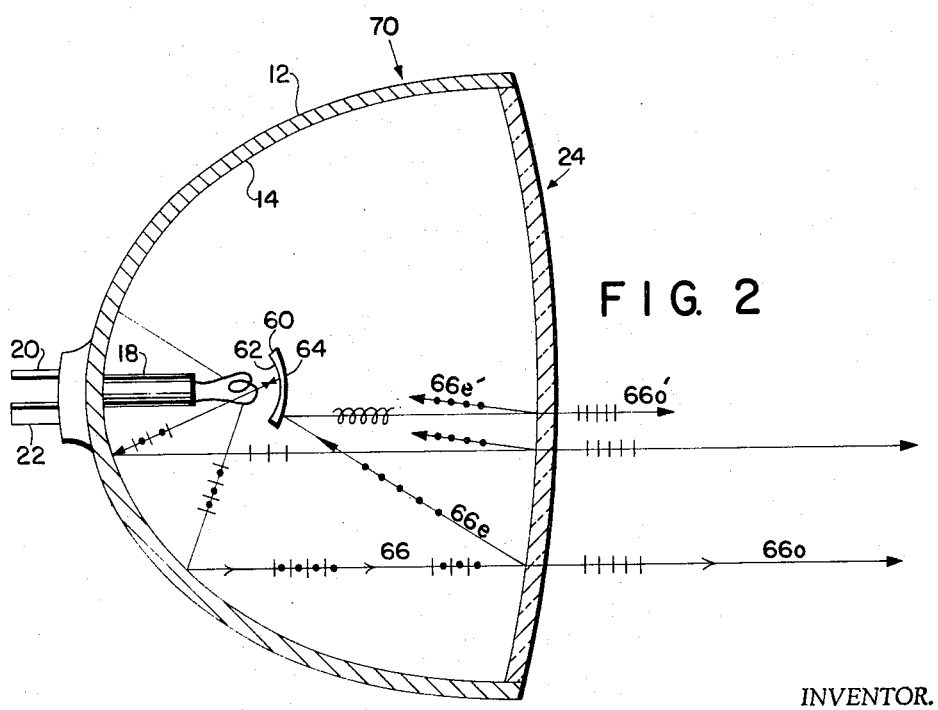
FIG. 2 illustrates an alternate embodiment of the invention.

In FIG. 2 is shown a modification of polarizing light projection assembly 10. Included therein is an opaque shield 60 having a concave spherical reflecting surface 62 positioned so filament 16 is at its center of curvature. Reflecting surface 62 intercepts all light emitted by filament 16 which would not be incident on metal reflecting surface 14. It reflects that light back on itself whence it passes through the loose coils of filament 16 to incidence on reflector 14. Reflector 14 projects it as a beam. Opaque shield 60 with reflecting surface 62 insures that all light emitted by polarizing light projection assembly 10 is within a controlled beam. On the opposite side of opaque shield 60 from reflector 62 is a second reflecting surface 64 shaped to reflect any rays, such as 66e, from the parabolic surface of polarizer 24 into a beam which is projected forward toward polarizer 24. Reflecting surface 64 can be coated with any metal which enhances the conversion to elliptical form of incident linearly polarized light. Rotation of the rejected polarization component in incremental quantities to the transmitted polarization azimuth is the same as described above. Light possessing a horizontal polarization azimuth, reflected by polarizer 24, circulates between polarizer 24 and reflecting surface 64 until it is all rotated and transmitted. Two advantages are had using shield 60. Distribution of the polarized light emitted by assembly 70 can be controlled exactly and surface 64 can be coated with a metal selected to enhance the conversion of elliptic polarization while the metal for layer 14 is selected to enhance reflection.

Light beams projected by assembly 10 or 70 can be modified in several ways. Parabolas 12 and 24 can be assembled with their optic axes tilted or so they are not confocal. Shapes besides parabolas can be used to control projected light beams. Still other techniques for controlling projected light beams are known in the art and their use is contemplated within the scope of this invention.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Apparatus for projecting polarized light, consisting essentially of:
    means for mounting a light source within said apparatus;
    polarizing means, configured in thin sheet form, for linearly polarizing light incident thereon from said source by transmitting a first component of said light having a first polarization azimuth and reflecting a second component of said light having the orthogonal polarization azimuth, said polarizing means being concave with respect to said light source; and
    reflecting means, situated opposite said polarizing means to directly receive said linearly polarized light reflected from said polarizing means, for elliptically polarizing said linearly polarized light.

2. The apparatus for projecting polarized light as described in claim 1, wherein said reflecting means comprises at least one metal surface.

3. The apparatus for projecting polarized light as described in claim 2, wherein said reflecting means comprises:
    mirror means, concave with respect to said light source, for projecting a beam of said light toward said polarizing means, and wherein a specularly reflecting metal layer on said mirror means accomplishes the elliptical polarizing.

4. The apparatus for projecting light as described in claim 3, wherein said polarizing means and said mirror means are parabolic.

5. The apparatus for projecting polarized light as described in claim 4, wherein said means and said polarizing means are confocal and said light source is at their common focus.

6. The apparatus for projecting polarized light as described in claim 2, wherein said reflecting means comprises:
- mirror means, concave with respect to said light source, for reflecting a beam of light toward said polarizing means; and
- a shield interposed between said light source and said polarizing means to prevent light emitted by said light source from reaching said polarizing means without first reflecting from said mirror means, said shield having a selected metal layer disposed thereon, facing said polarizing means, for converting linearly polarized light to elliptically polarized light by reflection.

7. The apparatus for projecting polarized light as described in claim 2, wherein said polarizing means is a polarizer of the parallel wire grid-type.

8. The apparatus for projecting polarized light as described in claim 2, wherein said polarizing means is a polarizer of the interference type.

* * * * *